United States Patent [19]

Gudmundson et al.

[11] Patent Number: 4,821,061

[45] Date of Patent: Apr. 11, 1989

[54] PHOTOFINISHING PACKAGING SYSTEM

[75] Inventors: Gunnar G. Gudmundson, Longmeadow; Martin E. Hebert, Williamsburg; Walter R. Hadank, Springfield; Raymond H. Crochetiere, Southampton; Douglas A. Kenyon, Brimfield, all of Mass.

[73] Assignee: Standard Manufacturing, Chicapee, Mass.

[21] Appl. No.: 18,097

[22] Filed: Feb. 20, 1987

[51] Int. Cl.[4] ...................... G03B 27/32; G03B 27/52; B26D 5/34

[52] U.S. Cl. ........................................ 355/40; 83/371; 355/77

[58] Field of Search ...................... 83/371, 71; 355/40, 355/41, 77, 29, 132, 133; 354/105, 109

[56] References Cited

U.S. PATENT DOCUMENTS

| | | | |
|---|---|---|---|
| 2,482,242 | 9/1949 | Brustman | 355/40 X |
| 3,230,808 | 1/1966 | Wise et al. | 83/371 X |
| 3,600,089 | 8/1971 | Walter | 355/41 X |
| 3,836,246 | 9/1974 | Bowker | 355/32 |
| 3,947,109 | 3/1976 | Kinder et al. | 355/41 X |
| 3,976,376 | 8/1976 | Hujer | 355/40 X |
| 3,987,467 | 10/1976 | Cowles | 355/40 X |
| 4,001,073 | 1/1977 | Jones et al. | 156/516 |
| 4,056,024 | 11/1977 | Baert et al. | 83/371 X |
| 4,077,827 | 3/1978 | Jones et al. | 156/352 |
| 4,088,404 | 5/1978 | Zahn et al. | 355/29 |
| 4,094,719 | 6/1978 | Jones et al. | 156/269 |
| 4,094,723 | 6/1978 | Jones | 156/353 |
| 4,292,115 | 9/1981 | Jones et al. | 156/502 |
| 4,370,409 | 1/1983 | Bostroem | 355/40 X |
| 4,574,692 | 3/1986 | Wahli | 355/40 X |

FOREIGN PATENT DOCUMENTS

| | | | |
|---|---|---|---|
| 2069465 | 8/1981 | United Kingdom | 83/71 |

*Primary Examiner*—Donald A. Griffin
*Attorney, Agent, or Firm*—Lyon & Lyon

[57] ABSTRACT

There is disclosed herein a photoprocessing system for receiving film and processing it into the final prints. The system particularly includes modifications to the film printer for encoding identification numbers onto the roll of prints which can key sets of prints to the respective film. Also, a film advance system is disclosed wherein the film is stopped during the printing process to allow a bar code to be read from each film of a roll of films. Additionally, an automated packaging machine is disclosed wherein the prints from a roll of prints are cut apart by a continuously running knife system. A film accumulator for cutting apart and stacking sections of film after it has been printed is disclosed, as is a batch management computer system for maintaining a file of information pertaining to the film, order envelope and print processing taking place.

10 Claims, 12 Drawing Sheets

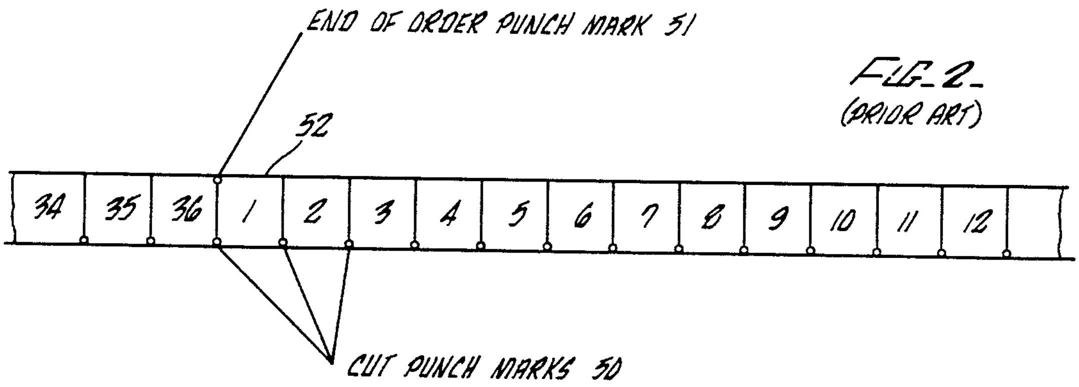
FIG. 2 (PRIOR ART)
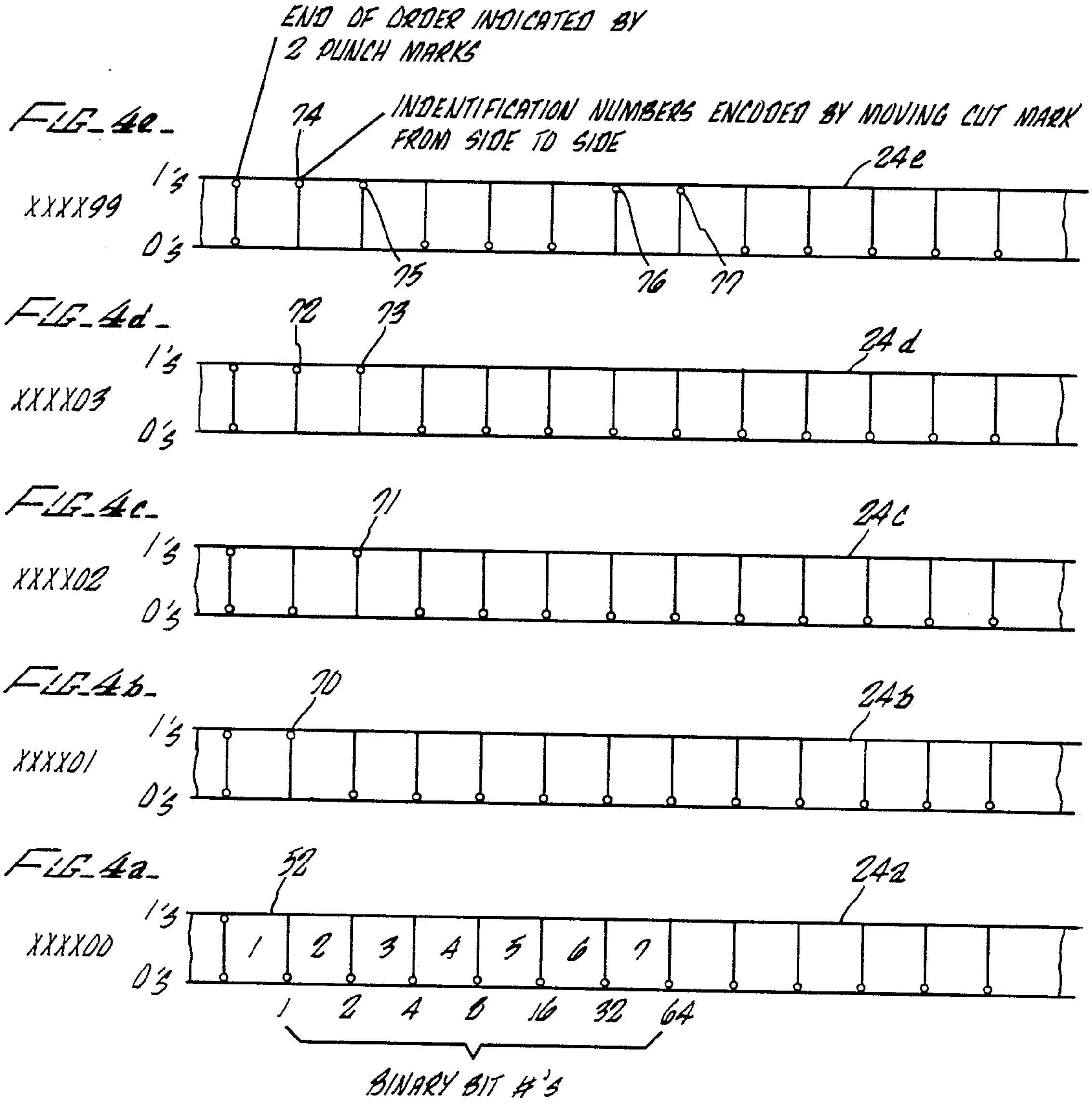

PHOTOFINISHING PACKAGING SYSTEM

The present invention relates to the field of photofinishing, and more particularly to an automated packaging system for use in photofinishing.

BACKGROUND

In large scale photofinishing plants or photo processing labs, the incoming films are removed from their order bags and are spliced together prior to processing into a large roll of typically about seventy-five films. At the time of splicing, the splicing machine applies an identification number to the splice on each film and to its respective order bag in which the film arrived at the lab.

The roll of spliced films is then developed, after which the developed roll is passed through a notcher or notching machine. This notcher scans the image area of the films and determines the center of each image. The machine then makes a small notch in the edge of the film to identify each frame. The purpose of the notch is to allow a subsequent printer to properly position the images of the film for printing of the images.

The next step in the usual prior system is to expose the frames of the developed film onto a roll of print paper. This is accomplished by the printer. The roll of print paper is then developed, and it is inspected for prints that are to be discarded (rejects) and prints that are to be made over to improve quality (remakes). Small black patches of tape usually are placed on the reject or remake prints to later be detected in a print cutter for sorting purposes.

Then, the roll of film, the roll of prints, and the corresponding stack of order bags are delivered to the packaging area of the lab where manual packaging is performed. This step puts the film and prints into the original order bag for return to the customer. A typical packaging material is a paper "wallet" having two pockets, one for the finished prints and one for the developed negatives. This paper wallet is placed in the order bag for return to the location (i.e., drugstore, etc.) where the film was originally left by the customer for developing.

The basic steps involved in packaging are:

1. Cut the prints from a continuous roll of print paper onto which they have been exposed (printed) and developed.
2. Cut into short pieces the roll of films (negatives) from the continuous roll of films into which they were spliced for processing and printing.
3. Check to see if the prints are the ones that match the negatives and if the negatives are the ones that belong to the order bag.
4. Insert the negatives and prints into the wallet and fold it closed.
5. Insert the wallet into the order bag and close its flap.
6. Calculate the price of the order and print it on the bag.

It sometimes is necessary to dispense one or two of the wallets depending on the number of prints (e.g., two sets) made for a given order. It also may be necessary to provide randomly fed wallets with graphics unique to one customer or another.

As noted above, such packaging presently is performed manually, and is a high cost, low productivity, labor intensive bottleneck in photo processing labs.

SUMMARY OF THE INVENTION

The present invention is directed to a modular packaging system and accessory components which can interface with other equipment in a photofinishing plant or photo processing lab, and which can enable an automatic packaging system to be provided. In order to provide an automatic packaging system and to insure that the proper films and prints go into the proper order bag, as well as perform the other steps involved in packaging, several things must be done upstream of the packaging operation to allow for elimination of the need for a human operator. The present invention involves several concepts in facilitating such an automated packaging system.

A first concept pertains to a print encoding system for simply adding a code to the roll of prints, and which makes it possible to cross-check if the prints being cut by the print cutting portion of the packaging machine belong with the film and order bag being handled simultaneously by other parts of the system. This concept involves selectively punching holes at edges of the print paper to create a simple machine readable code.

Another concept according to the present invention and which facilitates increased productivity involves the manner in which the prints are cut from the print roll. This concept involves continuously running the print cutting knife to eliminate the problems occasioned by the high mass of the cutting knife as it is periodically started and stopped as has been done in the past. According to this concept, the knife is run continuously and during the time the knife blades are open, the print paper is rapidly accelerated, a punch hole in the print paper is detected, and the punch hole is positioned under the knife before it cuts the print paper. This enables the packaging system to cycle at a very high speed and eliminates the need to start and stop the knife for each print cut.

A third concept according to the present invention is the provision of an attachment usable with the film printer to make it possible to stop the film splice (between adjacent films) under the field of view of a bar code reader. This allows the bar code to be simply and reliably read in a film transport system in which the film moves in a somewhat irregular jerking motion as each frame of the film is stopped for its exposure onto the print film, and then advanced to the next film frame which may be an irregular distance from the previous frame. This concept also allows the use of a relatively inexpensive bar code reader rather than the very costly and highly sophisticated holographic bar code scanners.

A fourth concept relates to a technique and system for accumulating cut pieces of the film from the spliced film roll. This concept involves a tamper and movable guide means for allowing a cut strip of negatives to be moved into a stack of such strips. This arrangement eliminates the usual sliding of one negative strip onto another which can result in scratched negatives and other problems. In addition, means can be provided for detecting and diverting leader cut from the film roll A fifth concept involves the use of a batch management computer for providing a file of information pertaining to what is happening to each film by receiving inputs from the splicer, printer and other sources.

Accordingly, it is a principal object of the present invention to facilitate the provision of an improved photo processing system.

Another object of this invention is to provide an improved packaging system for photo processing labs.

Another object of this invention is to provide equipment and techniques for use with existing photofinishing equipment and for improving the operation of the overall photofinishing system.

BRIEF DESCRIPTION OF DRAWINGS

These and other objects and features of the present invention will become better understood through a consideration of the following description, taken in conjunction with the drawings in which:

FIGS. 4*a* to 4*c* and 5 illustrate two different print encoding techniques provided by the system of FIG. 3 according to the present invention;

FIGS. 7*a* and 7*b* are more detailed versions of FIG. 6*a* and which further illustrate the details of the print cutting system of the present invention;

FIG. 10*a* is a side view and FIG. 1*b* is an end view of a film accumulating system according to the present invention;

DETAILED DESCRIPTION

Figure 1A:
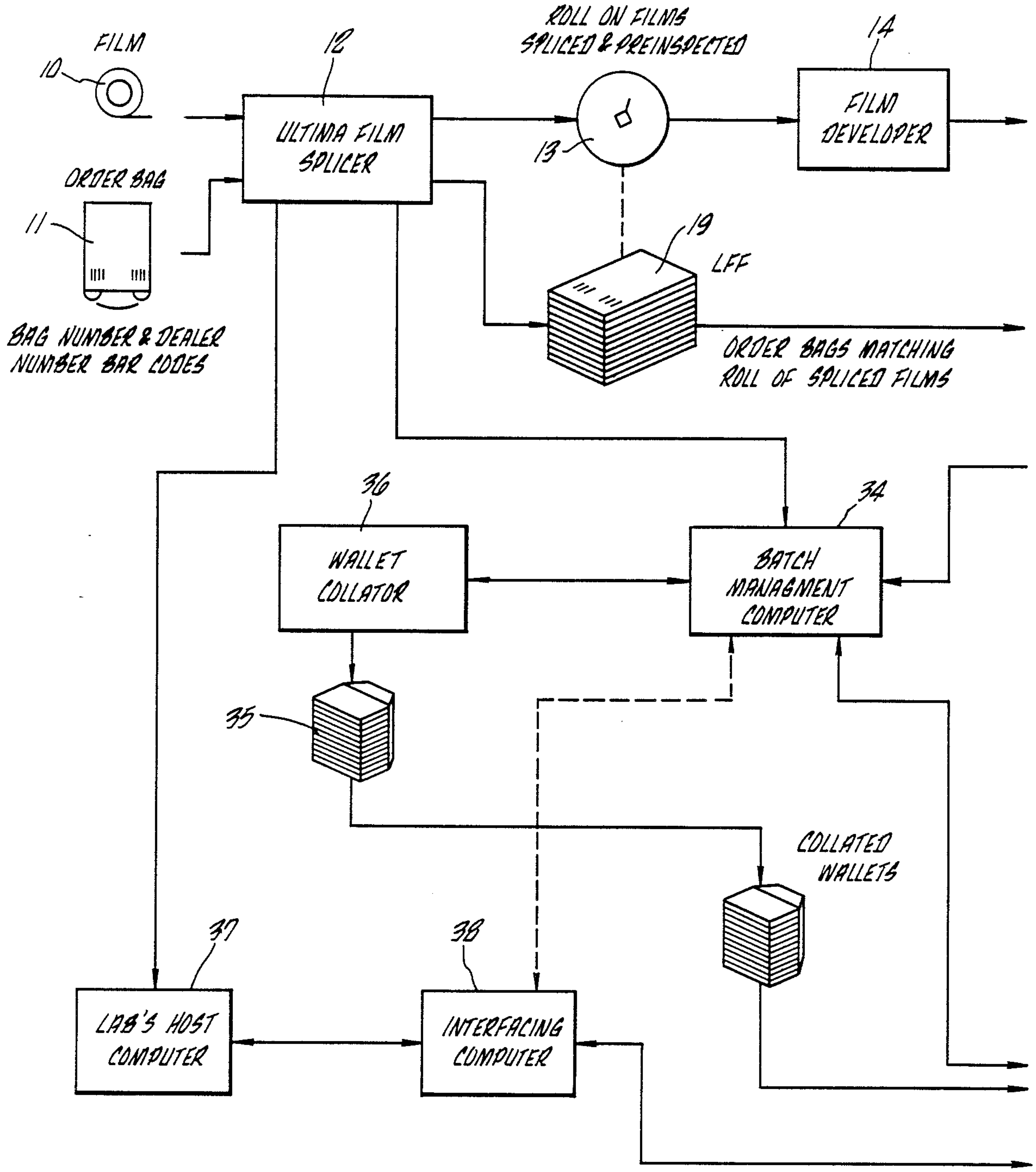
FIGS. 1*a* and 1*b* (taken together side by side) illustrate in overall block diagram form a photofinishing system incorporating concepts of the present invention.
Figure 1:
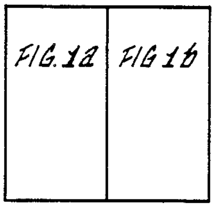
Figure 1B:
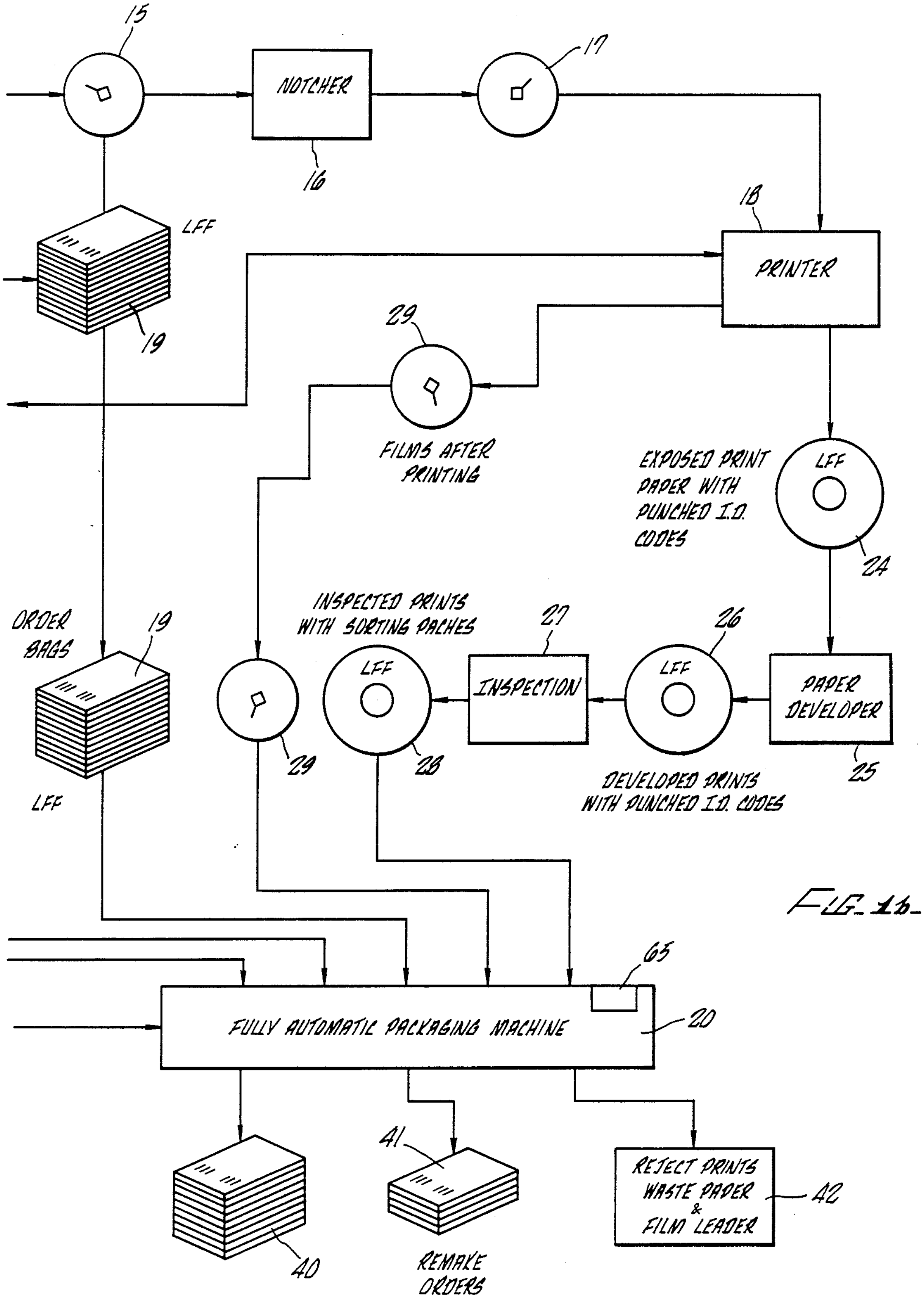

Turning first to FIGS. 1*a*–1*b*, the same illustrate an overall photofinishing or photo processing lab incorporating the concepts of the present invention. Film 10 is removed from an order bag 11, and both are sent to a film splicer 12 which splices together a number of rolls of film in a conventional manner. As is known, the typical order bag is bar coded with a dealer number and a bag number, with the latter number also being the claim check number. Also as is known, the films typically are spliced together with a tape splice, with each such spliced tape having a pre-printed sequential bar code different from that on the bag, and sometimes also an eye-readable number. The bar code numbers from the bag and the splice are "criss-crossed" or cross-referenced in eye-readable form by the splicer 12; that is, the bar code from the splice is read and applied in numerical form to the bag, and the bag number bar code from the bag is read and applied in numerical form to the splice. The splice bar code alternatively can be read and applied to the bag in both eye-readable and in bar code form, and this can facilitate simplifying the record keeping aspects of a photo processing system. After the coding and imprinting has taken place, the order bags 11 are stacked as indicated at 19 (FIG. 1*a*) and are sent to an automatic packaging machine 20 (seen at the bottoms of FIGS. 1*a* and 1*b*) for later use in packaging the film and print order.

The spliced together films 13 then go to a film developer 14 which develops the negatives, and the developed film 15 (FIG. 1*b*) is applied to a notcher 16 which makes conventional frame notches in the film used by the film printer for indexing. The notched films 17 which are ready to print are supplied to a printer 18.

The printer prints each frame of film onto a roll of print paper. The printer 18 also includes an attachment according to the present invention that reads the bar code on the splice between each spiced-together set of films, and controls punches in a manner according to the present invention to encode numbers (typically in binary or binary coded decimal form) onto the roll of prints according to each film order. The details of this encoding technique will be explained later.

The exposed roll of prints 24 goes through a print paper developer 25, and the developed prints 26 can move to an inspection station 27 where black patches can be applied to the leader to indicate a remake or reject in a conventional manner. These patches typically in existing equipment are placed on the right and left sides of the print paper to respectively indicate rejects and remakes. In accordance with the present concepts, an additional patch of this nature can be added in the center of the print paper to indicate a leader or waste paper which is to be cut off or discarded from the print roll. The roll of prints 28 then moves to the packaging machine 20. The roll 29 of films after printing leaves the printer 18 and also moves to the packaging machine 20.

A batch management computer 34 (FIG. 1*a*) receives information from various subsystems of the overall system, and keeps track of the various information needed for insuring orderly operation of the system and bringing together at the end the appropriate processed negatives 29, prints 28, paper wallets 35 and order bags 19. The computer 34 is connected to various components and subsystems, and will be described in greater detail subsequently.

The lab system further includes a wallet collator 36 (FIG. 1*a*) which supplies the stack of wallets 35 to the packaging machine 20. Typical photo processing labs include a host computer 37 as is well known, and the same can be interfaced with the batch management computer 34 and packaging machine 20 by an interfacing computer 38 if desired.

The packaging machine 20 cuts the developed film into film strips, cuts the prints apart, and packages the film strips and prints into the wallet. The wallet is then loaded into the order bags which are suitably priced and stacked as shown at 40. Cross-checking between the order bag, film and prints is performed based on information received from the batch management computer 34, along with reading the order bag and film splice bar codes. Print matching is performed by decoding the cut mark punch locations in the print roll which were added by the printer 18 as will be described subsequently, and comparing the resulting code or number with the bar code number on the film splice. Remake orders are shown at 41, and reject prints, waste paper and film leader are shown at 42.

Figure 3:
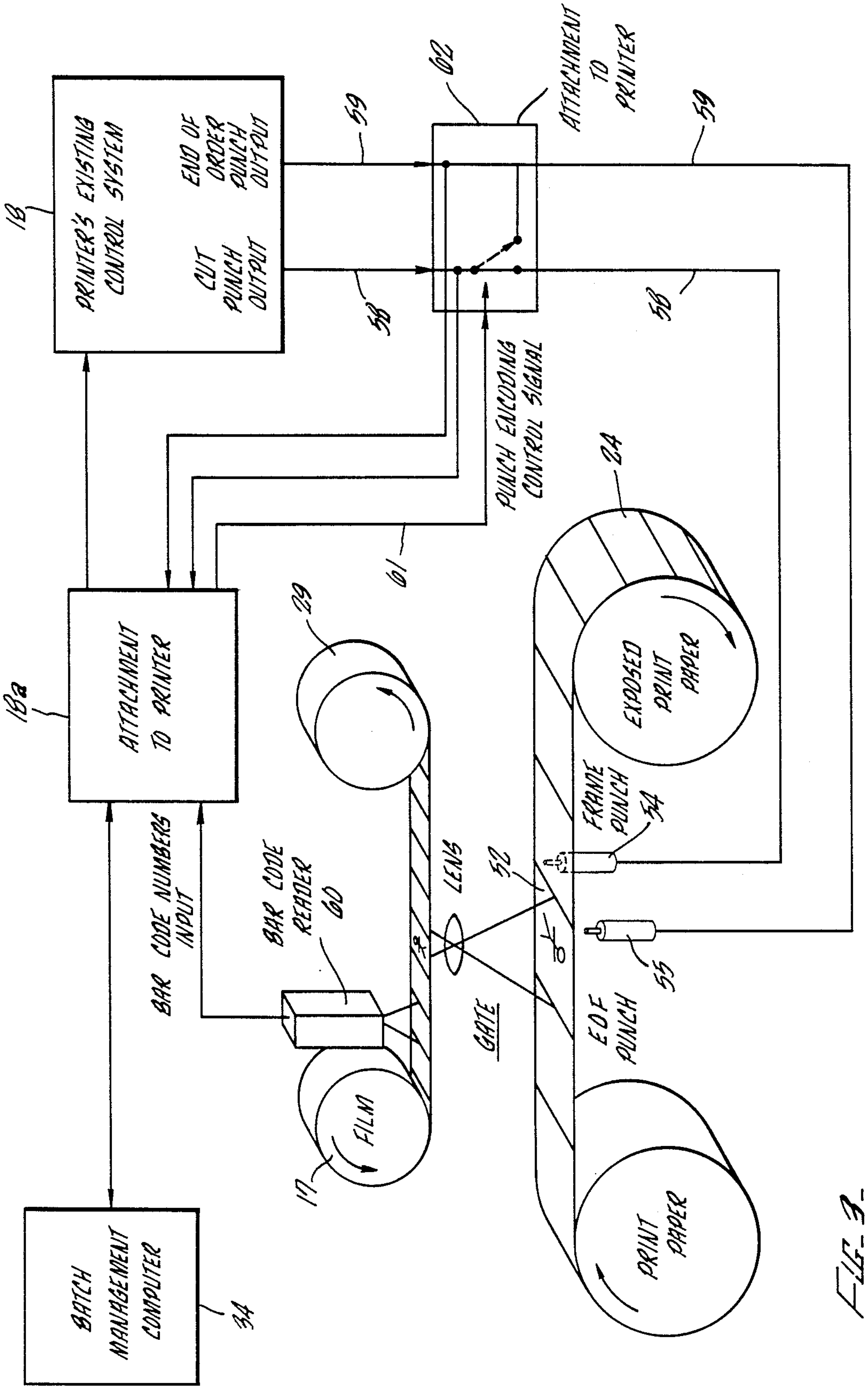
FIG. 3 is a block diagram of a print encoding system incorporating the concepts of the present invention.
Figure 2A:
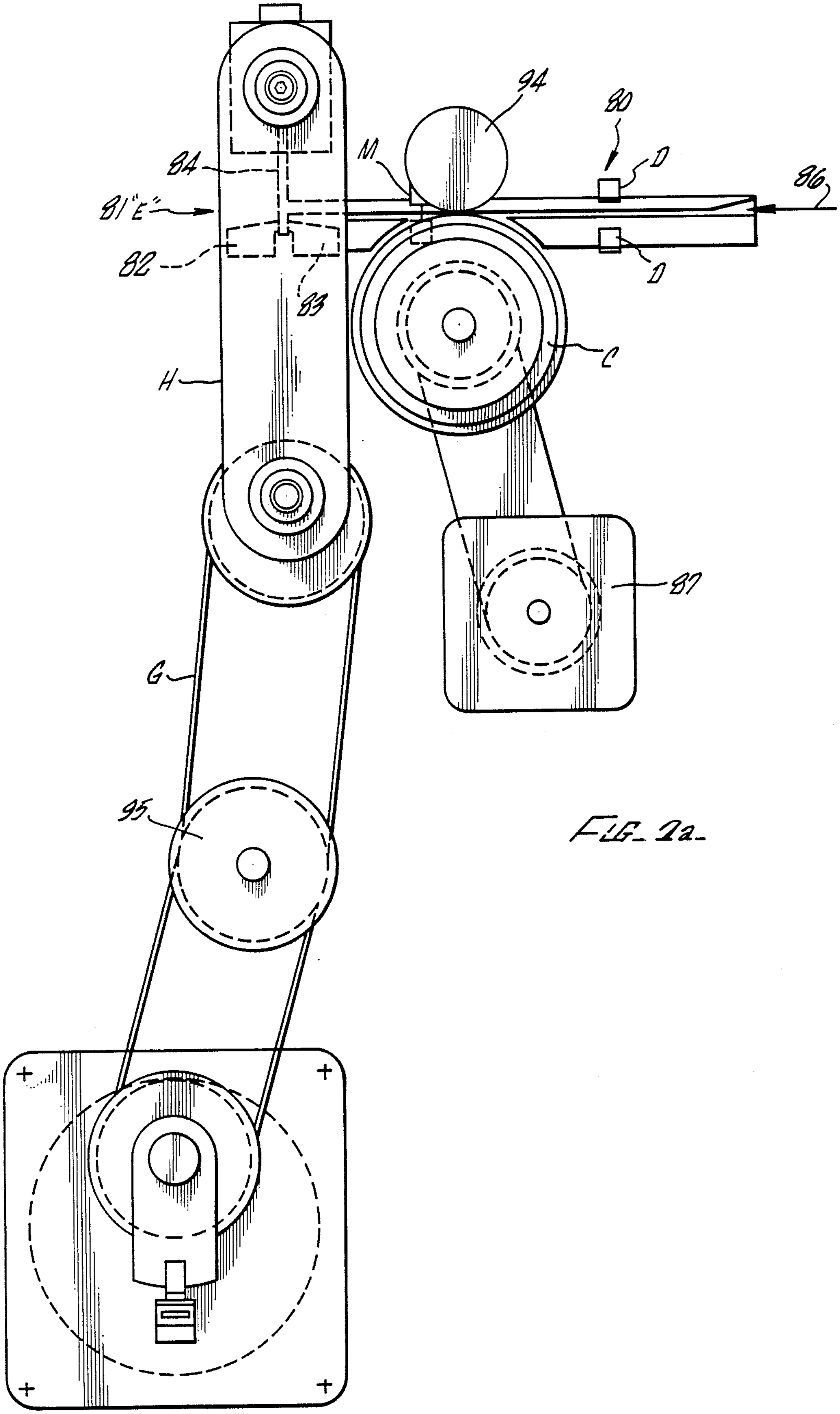
FIG. 2 is a diagram of a prior art print encoding technique.
Figure 16:
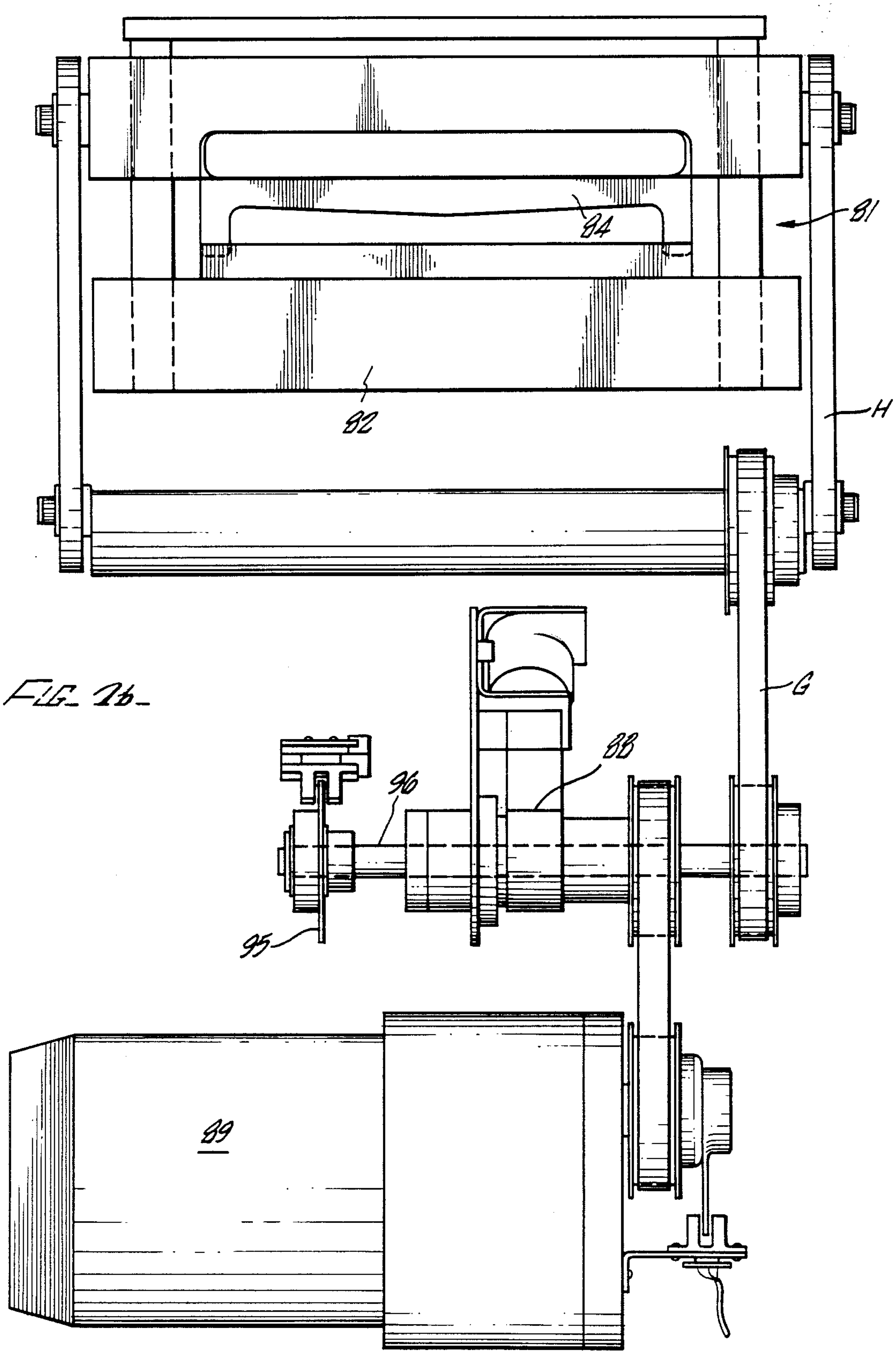

Turning now to the print encoding technique and system according to the present invention, the same makes it possible to cross-check if the prints being cut by the print cutting portion of the packaging machine 20 belong with the film and order bag being handled simultaneously by other parts of the packaging machine 20. In order to check if the prints and films match, it is necessary to add some kind of information on the prints that can be read by the packaging machine 20. This is done, as will be explained below, by controlling and varying the position of punched holes that are presently used to indicate the cutting line between individual prints and the cutting line at the end of one film's set of prints and the next. Present prior art systems punch holes in the roll of prints as illustrated in FIG. 2. One hole is punched in the waste boundary between every print 52, and these are labeled cut punch marks 50 in FIG. 2. Each of these holes is near the edge of the paper and occurs on that edge in such prior systems. Another punch hole 51 is located exactly opposite to a cut punch 50 at the other edge of the print paper as seen in FIG. 2, and this punch hole exists only where there is a boundary between the prints (e.g., frames 36 and 1) belonging to adjacent separate films. These holes are made by respective punches 54 and 55 as shown in FIG. 3. These punches 54 and 55 are part of the conventional printer, and are controlled by the printer such that the frame or cut punch 54 is fired or energized after each print paper advance, and the "end of order" punch (EOF) 55 is energized or fired after a splice joining two films as detected by a sensor in the film track of the printer 18.

According to this print encoding technique, the bar code number on the splice between films is read from the film roll by a bar code reader 60 as the splice approaches the film gate of the printer 18. That bar code is stored in the memory of a printer attachment **18*a* (FIG. 3) and after the printer 18 has sent a signal 59 to its end of order punch 55, the cut punch output 58 is selectively made to go to either the punch 54 or the punch 55** so as to selectively punch a hole on one edge of the print paper or the other edge of the print paper in a form of pattern that represents the one's and ten's digits (0 through 99) of the splice bar code number.

With this approach, there will always be two holes at the boundary between the prints from adjacent films, and one hole for each cut position between prints, but this latter cut hole differs from the prior art systems in that this letter cut hole according to the present invention is caused to occur selectively on either edge of the paper. In this regard, reference should now be made to FIG. 4 which shows in FIGS. **4*a*–4*e* a sequence of respective print rolls 24*a*–24*e* wherein each is encoded in binary fashion in this manner with different numbers. The lower edge of each print roll can be considered to be the 0's edge and the upper edge can be considered to be the 1's edge. Each print 52 up through the seventh print in this example represents a binary bit. In FIG. 4*a*, the coding represents zero because all the cut punch marks are on the bottom edge (as is conventional). However, in FIG. 4*b* the first cut punch hole 70 has been made at the top edge, thereby representing a binary one, and thus a decimal 1. In FIG. 4*c*, the second cut punch hole 71 is a binary 1 representing binary 01, thus equalling the decimal number 2. In FIG. 4*d*, the first and second cut punch holes 72 and 73 are 1's representing binary 11 and the decimal 3. Finally, in FIG. 4*e*, the first, second, sixth and seventh cut punch holes 74–77** are 1's thereby representing decimal 99 (1+2+32+64=99).

Figure 5:
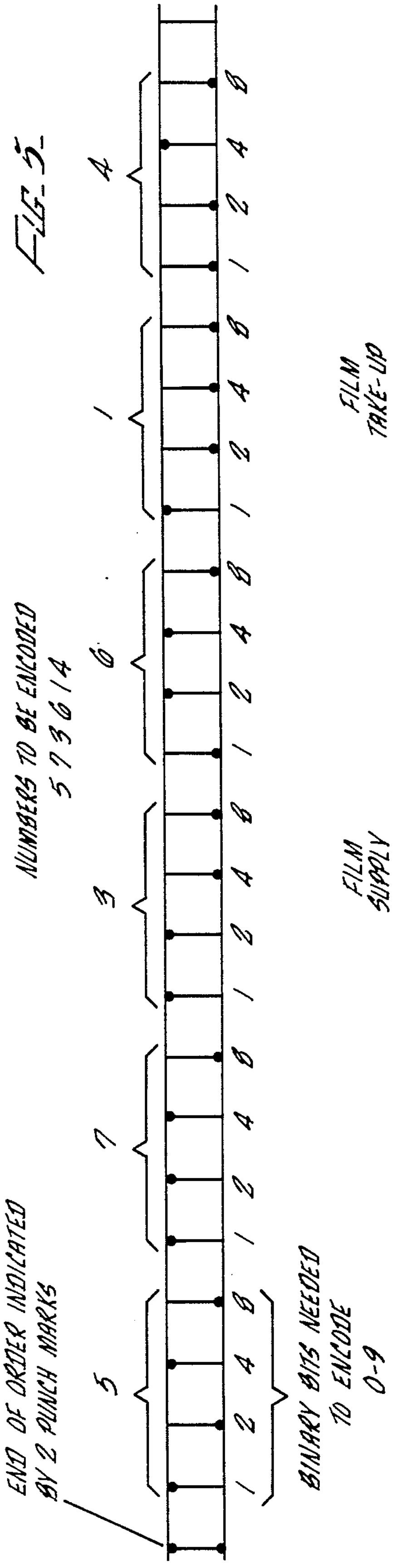

Turning again to FIG. 3, the roll of film 17 to be printed onto the print paper 52 is illustrated, as well as the control system of the printer 18 for providing a cut punch signal 58 to the frame punch 54 and an end of order punch signal 59 to the end of order punch 55 as is conventional. The system of FIG. 3 further includes the bar code reader 60 which reads the bar code from the splice between films, and sends the bar code to a control attachment **18*a* for the printer 18. The control 18*a* receives the signals 58 and 59 from the printer control, and provides a punch encoding control signal 61 to a switch 62 to selectively cause the cut punch output 58 from the printer 18 to go to either the frame cut punch 54 or to the end of order punch 55 so as to accomplish the encoding of the print roll as illustrated in FIGS. 4 and 5. The control 18*a* thus selectively allows the signal 58 to be applied from the printer control 18 to the punch 54 to encode 0's, or inhibits this operation and causes the signal 58 to be applied to the end of order (EOF) 55 to encode 1's. The end of order signal 59** is still applied in a normal fashion to indicate the end of an order.

The packaging machine 20 includes an optical sensor 65 for detecting the encoded punch holes in the print roll. As the film/print orders run through the packaging machine 20, it can keep track of the pattern it has detached when cutting the prints of a given order and then decode that information into the number that it represents. This number then is compared with the bar coded identification number from the splice of the corresponding film to determine if the last two digits match. If there is a match, the packaging machine will complete the packaging cycle but, if not, an alarm or other suitable indication can be provided to alert the operator to the error.

Another variation of the encoding technique as shown in FIG. 4 is to decode the film splice bar code at the printer 18 and encode it into the entire binary pattern that would represent all digits of the splice bar code number. This becomes a 21 digit binary number for a six-digit decimal splice bar code number. That pattern can be punched into the print roll a the prints are printed. If there are fewer than the twenty-one prints required to encode the full six-digit number (e.g., in a 12 or 20 exposure roll), there will be at least a partial pattern provided and which should be sufficient for identification purposes. At the packaging machine 20, as the films are cut into film strips, the bar code on each film splice can be read by a scanner and decoded into the binary pattern that should have been punched on the roll of prints. This code then can be compared with the code detected from the prints as they are cut. If there are not enough prints made to punch the complete binary pattern, the partial pattern is compared with the equivalent part of the pattern that was decoded from the film's bar code. If the partial patterns match, then the prints belong to the film and the packaging machine can proceed with the packaging.

Another variation of the encoding concept is illustrated in FIG. 5 and involves decoding the splice bar code number and punching it into the print roll as described above, but to punch a binary coded decimal (BCD) pattern instead of a pure binary code as illustrated in FIG. 4. With this encoding, the first four prints contain the four bits of the binary code to represent zero through nine in the one's digit of the number. The second four prints will contain the bits needed to give the ten's digit of the number, and so on until all of the digits have been encoded. This requires twenty-four punch marks for a six-digit number as will be apparent from FIG. 5.

An additional cross-check between the prints and the other parts of the package, namely the splice on the film and the order bag, can be made by making use of the information received and filed by the batch management computer 34. This computer retains in its memory the number of prints that were made by the printer 18 for each film. Therefore, as another cross-check, one can check to determine if the correct number of prints have been seen at the packaging machine 20 for each respective film.

According to another aspect of the present invention, and as noted earlier, print cutting of the individual prints from the final print roll 28 (FIG. *1b*) can be accomplished by causing the knife mechanism to run continuously and by starting and stopping the print paper. This part of the packaging machine is shown in greater detail in FIGS. 6 and 7. FIG. *6a* shows a simplified front elevation view of the packaging machine 20, and it along with FIGS. *7a–7d* illustrate details of the print supply system from the final exposed print roll 28 to a paper and hole sensor 80 and cutting mechanism 81. The typical knife system 81 (81 and "E" in FIGS. *6a* and *7a*) which is used to cut prints from a print roll is a punch and die type system that removes a small slug of print paper approximately 0.1" wide between successive prints as it cuts them apart. The knife is shown generally at 81 in FIG. *6a*, and is shown in greater detail in FIGS. *7a–7b* which illustrate knife dies 82 and 83 and a knife punch 84. The typical knife in the usual print cutter has a relatively high mass and is started and stopped once per each print cut usually via a clutch system. The clutches wear out frequently and the start and stop movement of the high mass knife slows down the cutting operation. The present system allows for smooth continuous motion of the cutting system.

According to the present invention, the knife 81 runs continuously. During the time the knife blades (84 and 82–83) are opened, the print paper 86 is rapidly accelerated by a stepping motor 87, the cut mark (punch hole) in the print paper is detected, and this mark is positioned under the knife blade 84 before it comes down again. This allows the cutting system to cycle at very high speed and eliminates the need to start and stop the knife for each print cut. A clutch 88 (FIG. *7b*) preferably is provided in the knife drive system (e.g., on a shaft 96) to allow the knife to be stopped in the event there is no cut mark on the print paper as a result of a punch failure in the printer, and to allow for stopping the knife in a controlled position.

FIG. *6a* illustrates the print supply roll 28 and the roll of prints 86 which moves around a dancer roll 87, idler 88, and continuously running rollers A. The rollers A run continuously to produce a slack loop B. The print web 86 advances past optical paper hole sensor D (which senses the presence or absence of the print paper) of the sensor 80, between a drive roller C (note FIG. *7a*) and a spring loaded pressure roller 94, and past the punch hole sensors M. The roller C is driven by a stepping motor 87 to feed the print paper 86 and the cut mark (punched hole) from the optical hole sensors M to the knife E (FIGS. *7a–7b*). The knife E is driven from a motor 89 via a clutch 88 and belt drive system G and link H (FIG. *7b*). A timing wheel 95 (FIGS. *7b–7d*) is provided on a shaft 96 driven by the motor 89 and can provide a synchronizing pulse to the knife and paper drive system so that the feed roller C can begin to feed the next print, and provides another pulse that indicates the "last chance" to stop the knife E before cutting the print roll. The timing wheel 95 includes holes J and K (note FIG. *7c*) for this purpose and these holes are sensed by sensors 92 and 93.

The basic cycle is as follows:

A. A timing mark J on the knife drive indicates that the knife E is open.

B. The stepper motor 87 driving the roller C ramps up to full speed, thereby driving the print paper 86.

C. Optical sensors M detect the punch hole in the edge of the print paper 86.

D. The paper feed is measured by an encoder on the stepper motor 87 that tells the control system how far the paper 86 has been driven as it is fed toward the knife 81. At the time the stepper motor 87 begins to ramp up, the control takes the maximum number of steps remaining, i.e. the maximum time remaining, to position the longest possible feed under the knife 81 before it begins to close (cut) and begins to substract steps that are made.

E. As the print paper is being fed, the photo optic sensor M looks for a punch hole in the print paper. This will determine the remaining number of steps to be made to position the hole exactly under the knife blade 84 since the distance M to the knife blade is a fixed distance.

F. The stepper motor then ramps down and positions the hole at the knife and the knife cuts the paper, then the cycle will continue. The foregoing represents a normal cycle.

The sensor M thus and the stepper motor 87 provides the ability to make a "last minute" change in the positioning of the print paper and punch hole by the stepper motor and roller C.

If, at the time the "last chance" timing mark K of the knife has been seen there are too many steps remaining to position the hole before the knife closes, the knife will be stopped. Stated differently, when the machine starts feeding the paper toward the cutter, the system starts counting the steps still to go and when the hole is finally seen at M, if there is not enough time to get the cut hole in the paper to the knife in the remaining time, the knife is stopped. A likely cause of this condition can be a bind in the paper or something that held it back during the time the paper started to advance the hole up to the sensor M.

If no punch hole has been detected by sensor M in the distance one should have been detected based on the system's averaging from memory several previous print feed increments, the decision can optionally be made to stop the knife or to cut at the interval where the hole should have been. As the machine is running along performing its normal cycle, it keeps track of how far it fed each of the last eight prints and it averages them all together so that as the cycle runs along and a hole is not detected at M where one should have existed based on the average, a cut will be made anyway because it may have been that the printer punches inadvertently failed to make a punch hole. Therefore, it is safe for the most part to make the cut in this case. The system is user selectable so that it can either do a blind cut as explained above or stop the cut, or even cut a number of times between successive prints and then later stop if it has not seen a punch mark after several prints. Thus, one or several punch marks can be missing and the cuts still be made as usual. The control program or system can thus provide the option to cut or not as choosen by the operator and, in addition, the number of blind cuts acceptable can be user selectable.

Figure 6A:
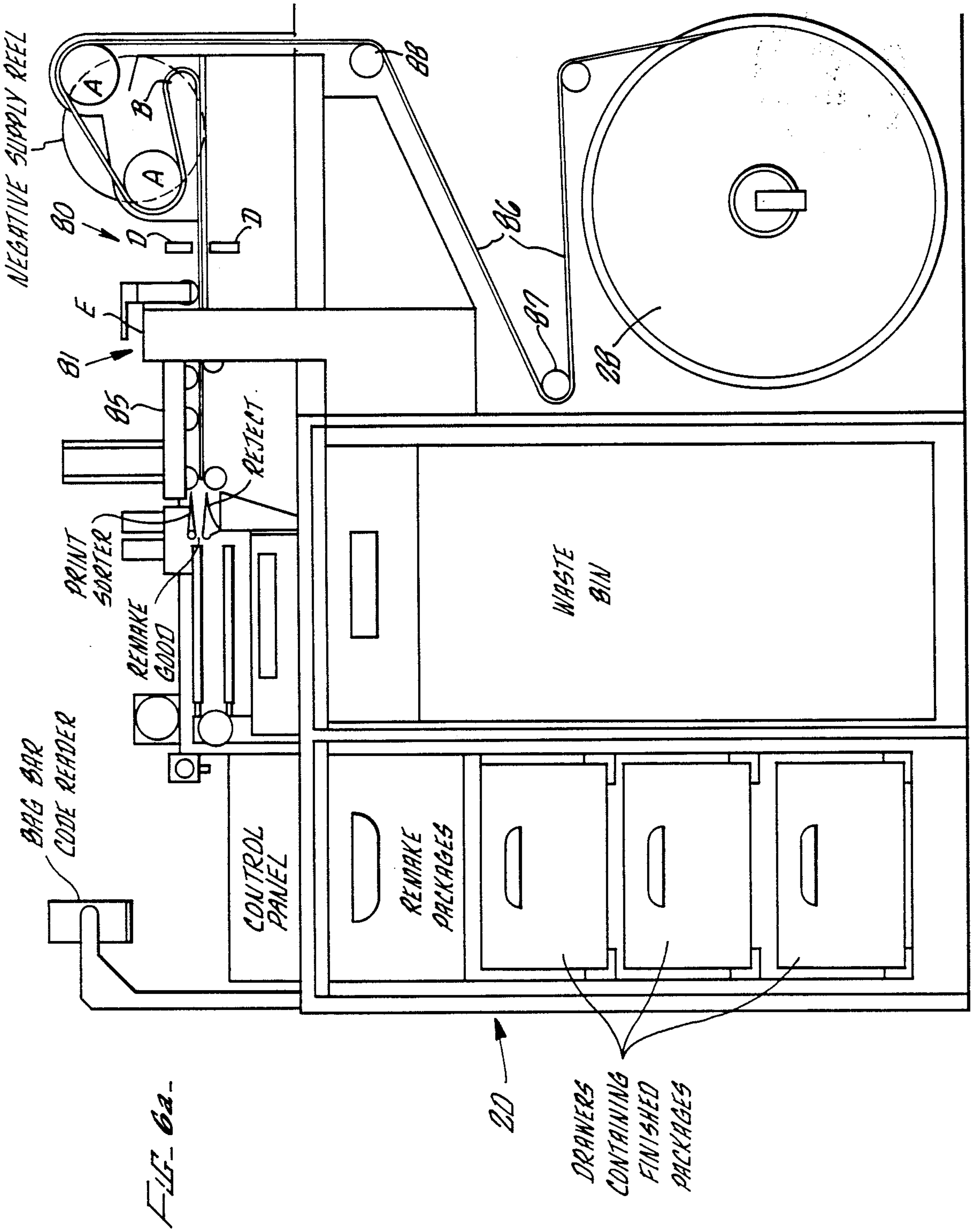
FIG. 6*a* is a front elevation view of a packaging console, principally illustrating the print handling and cutting system of the present invention.
Figure 7D:
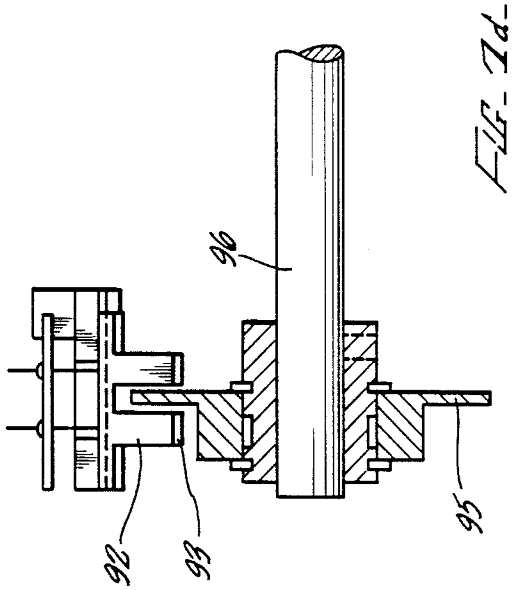
FIGS. 7*c* and 7*d* and illustrate side and front views of a timing wheel for the cutting system of FIGS. 7*a*–7*b*.
Figure 7C:
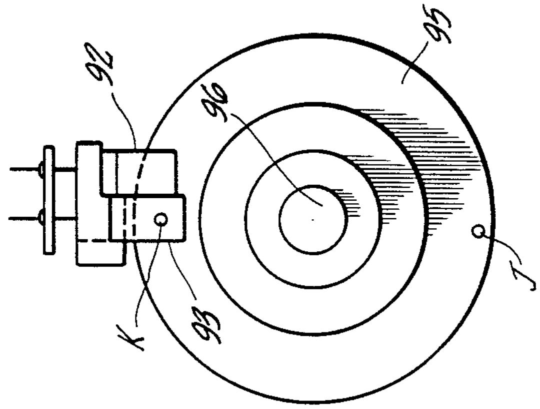

Turning again to the sensor D, it is a print paper sensor and is used to insure that the last piece of the end of a print roll is not cut any shorter than the minimum length required to pass through the sorting unit of the packaging machine following the knife 81. An accelerator 85 following the knife takes the cut prints and sends them through the sorting section of the machine as seen in FIG. 6*a*. When the very end of a roll of paper is approached, it should not be randomly cut and end up with a little paper sliver that can jam the mechanism. Thus, when sensor D sees light (there is no more paper) the machine makes a cut no matter what so that the last piece of paper will have a length as long as it is from D to the knife 81 and this is long enough to make it through the sorting mechanism and down into the trash without jamming the mechanism.

Figure 6B:
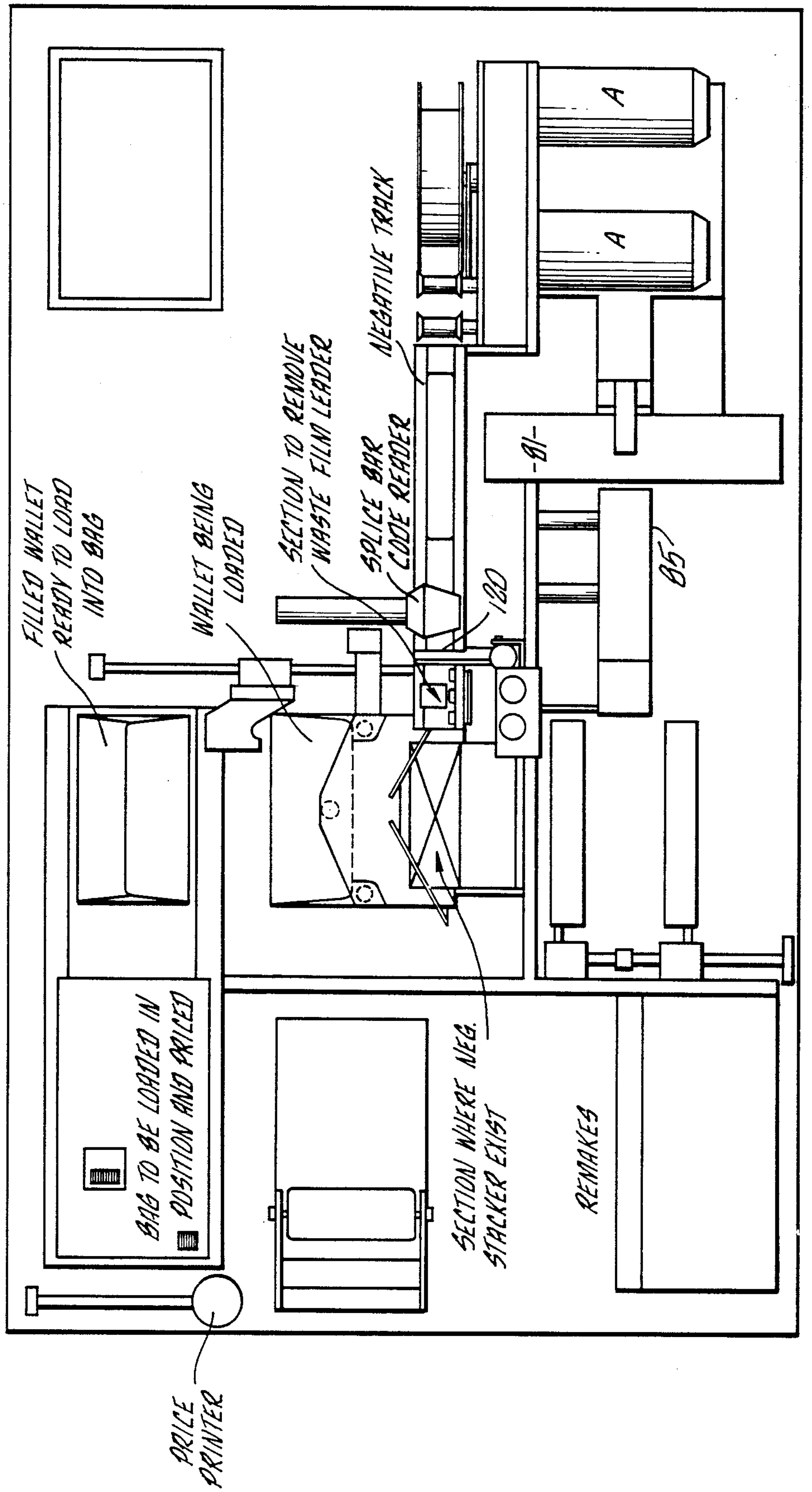
FIG. 6*b* is a top view of the packaging console of FIG. 6*a* and particularly illustrates film handling and cutting.

FIG. 6*a* generally illustrates other components of the packaging machine 20 as labelled. FIG. 6*b* is a top or plan view of the machine illustrating toward the bottom of FIG. 6*b* the components of the print cutting and sorting system described above, but more particularly, illustrates the film negative handling and packaging by the packaging machine 20.

Figure 8A:
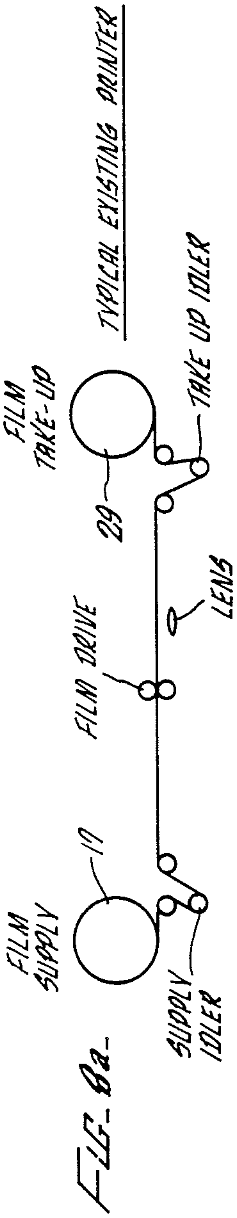
FIG. 8*a* illustrates a typical prior art film advance system.
Figure 8B:
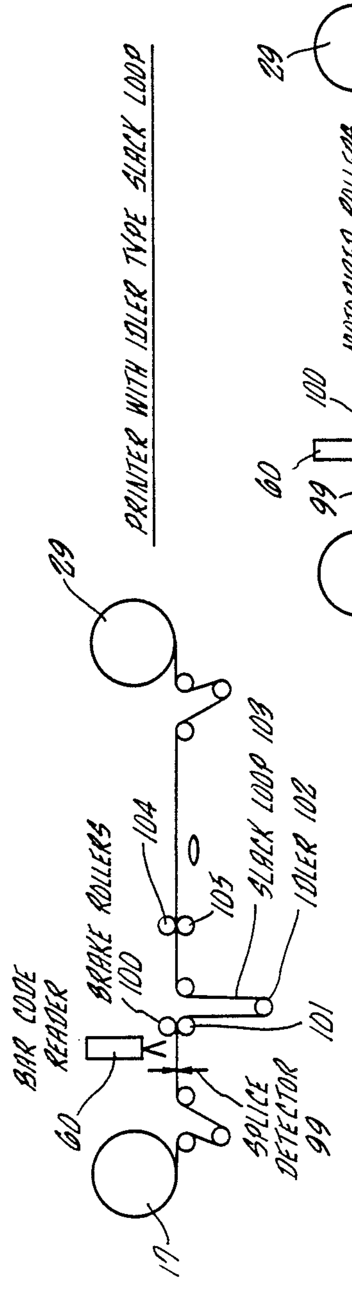
FIGS. 8*b* and 8*c* illustrate film advance systems for a printer according to the present invention.

Turning now to FIG. 8, FIG. 8*a* illustrates a prior art film drive and advance system for moving the film in the printer 18 from the film supply 17 to the film take-up 29 during the process of exposing the film negatives onto the print paper. As is known, the film moves in a somewhat irregular jerking motion as each film frame is stopped for its exposure onto the print paper, and then is advanced to the next film frame which may be an irregular distance from the previous frame. Because of this motion, it is difficult to accurately detect a code on the film splice. A further concept of the present invention is to make it possible to stop the bar coded splice under the field of view of the bar code reader 60 during the printing operation so as to insure that the bar code is correctly read and to enable a relatively inexpensive bar code reader to be used in the system. The splice and bar code thus are detected and read at the time the bar code is in the field of view of the bar code reader 60. This can be accomplished photo-optically since the splice has a higher optical density than the darkest possible part of the film. When the splice is detected at 99, a brake can be applied to a pair of brake rollers 100–101 which the film passes between. This causes the film to stop and keeps from moving the splice bar code during the time the bar code reader 60 reads the bar code.

As will be apparent to those skilled in the art, the usual mechanism of the printer will still be trying to pull the film through the brake rollers 100–101. This problem is solved by adding an idler 102 to provide a slack loop 103 between the braking rollers 100–101 and the film drive rollers 104–105 of the usual printer mechanism. During the short time the brake rollers 100–101 are activated to stop the film, the idler 102 rises as the slack loop 103 is taken up. When the bar code has been read by the reader 60, the brake rollers can be released, and the idler 102 will fall back to the bottom of its travel (to the position shown in FIG. 8*b*). In the event that the bar code reader 60 cannot read the bar code by the time the slack loop 103 has been used up, the fact that the idler is approaching the top of its travel can be sensed and the brake be released. In this case, an error number or code can be supplied to the printer to be encoded on the prints to indicate to the subsequent processing equipment that the bar code was not read or was unreadable.

Figure 8C:
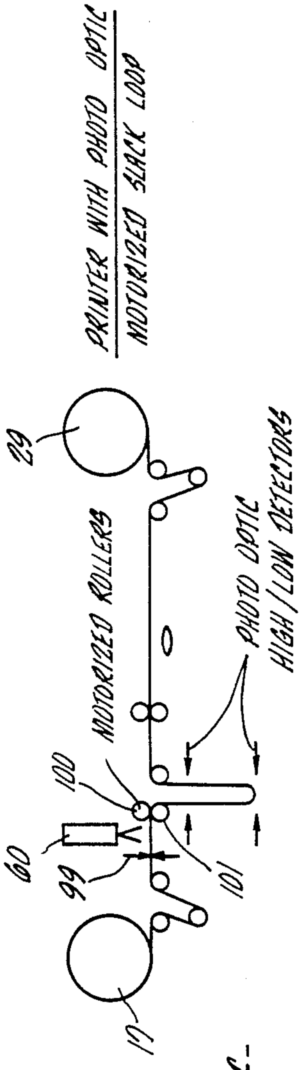

In some printers, the weight of the added idler 102 may be too much and may interfere with the printer film drive. As an alternate, the brake rollers 100–101 can be motorized as indicated in FIG. 8*c* to feed the film into a slack loop 107 which can be sensed at its extreme ends (top and bottom) by suitable photo-optic sensors.

Figure 9:
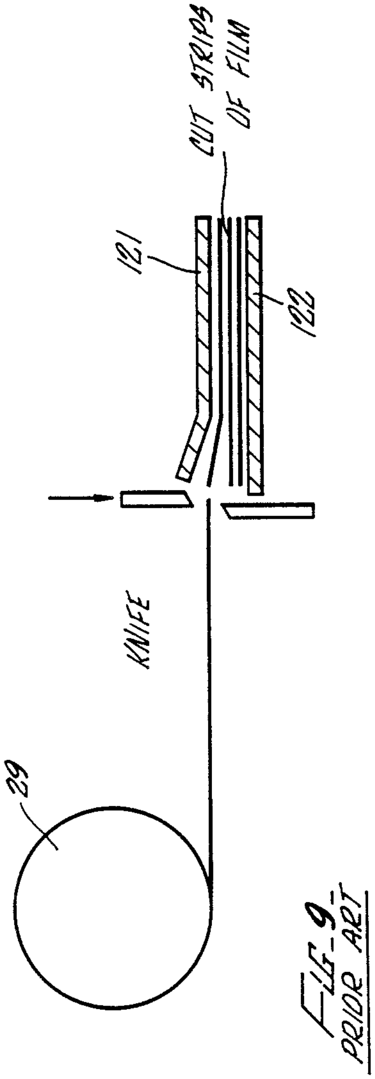
FIG. 9 PRIOR ART
FIG. 9 illustrates a typical prior art cut film strip accumulator.

Another concept according to the present invention involves a new form of film accumulator for obviating problems occasioned in prior systems. FIG. 9 is an illustration of a prior system for cutting, catching and stacking cut strips of the printed film. The roll of film 29 advances to a knife 120 which cuts the film into pieces, typically four frames, which are then received by a catcher 121 and a tray 122. As is known, when the knife 120 completes its cut, a cut piece of film falls to rest in the tray 122, usually under a light holding force that holds the cut piece down below the plane of the next piece of film to be fed and cut. When the next film piece is fed, it is forced to slide on top of the previously accumulated piece, as illustrated in FIG. 9. This can cause scratches to occur because of rubbing together of the film sections. Another problem that occurs is that the raw cut edge may snag in the perforation holes of the previously cut film piece, thereby causing dislocation of the stack. This is not a problem in a manual system where the operator realigns the stack manually before inserting it into the paper wallet, but can present problems in an automated system and is not an acceptable way of accumulating a film stack.

Figure 10B:
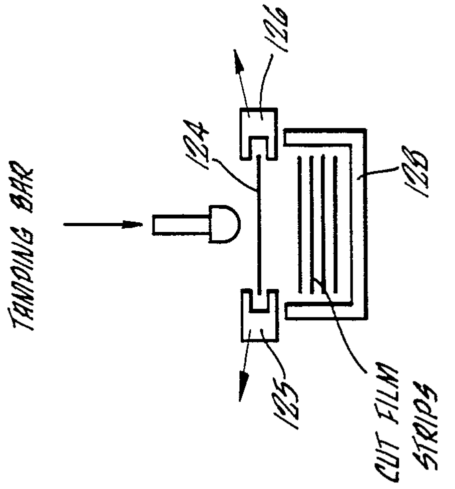
Figure 10A:
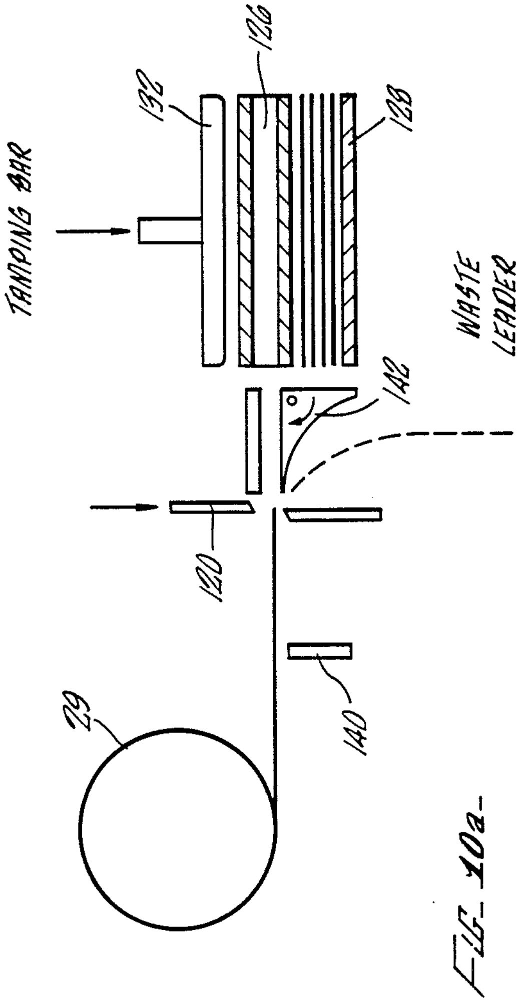
Figure 11A:
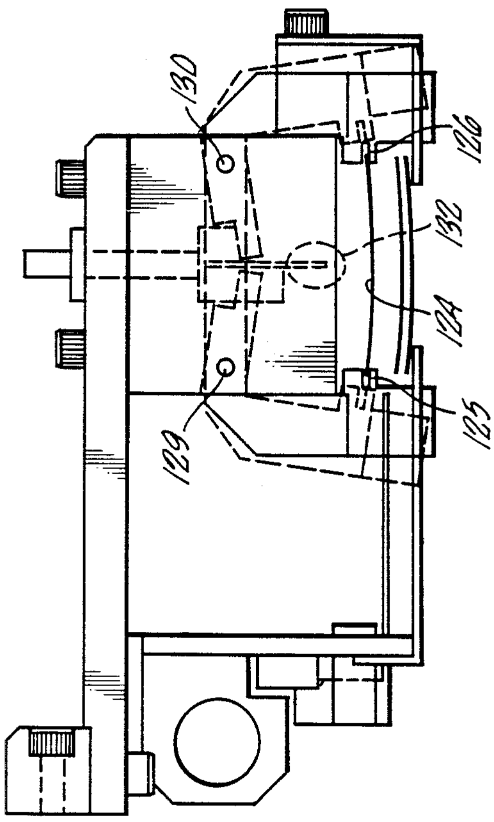
FIGS. 11*a* and 11*b* are a more detailed end view and elevation view respectively of the movable edge guide, gripper and tamper system of the film accumulator of FIG. 10.
Figure 11B:
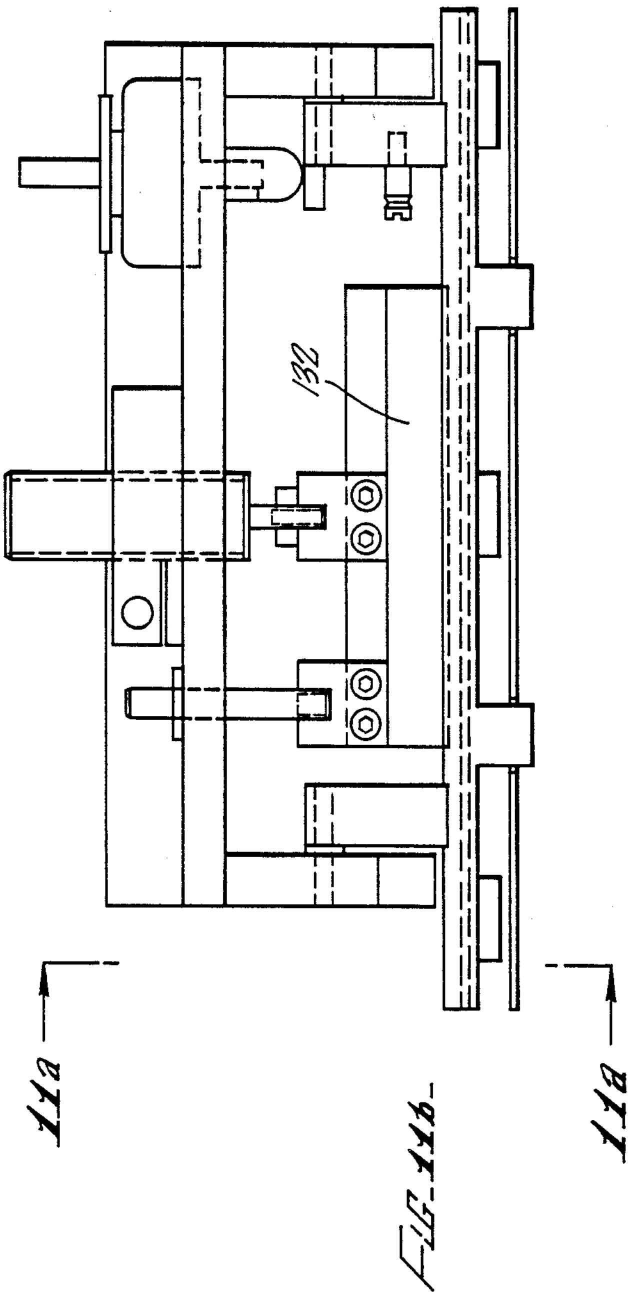

An exemplary embodiment of an improved form of film accumulator is illustrated in FIGS. 10*a*–10*b* and in FIG. 11. A film section 124 is cut into the usual piece by the knife 120, and fed into a short section of track long enough to accommodate its length. This track is formed of a pair of edge guides 125–126 that support the film by its edges only. A catch bin 128 is provided slightly below the track 125–126 to accumulate the sections of cut film. The two edge guides 125–126 pivot apart as shown in FIGS. 10*b* and 11, thereby allowing the section of film 124 to pas down between the tracks 125–126 into the bin 128. The tracks or edge guides 125–126 can pivot on respective pivots 129–130 as see in FIG. 11. A soft surfaced tamping bar 132 is arranged above the plane of the film section 124 in the track. This bar pushes the film 124 down into the stack when the edge guides 125–126 pivot apart, and hold the film section 124 there until these edge guides are brought back together, after which the tamping bar 132 retracts to allow the next piece of film to be fed into the edge guides. By using this technique, a stack by virtual stacking can be produced without producing any relative motion between the pieces or sections of film in the stack.

Additionally, a further improvement over existing film cutting systems is provided and in which sections of threading leader that are sometimes inserted in between films or batches of films on a given roll can be automatically detected and removed. This facilitates automating the packaging system and in present systems the threading leader is manually removed by the operator at the time of packaging. This is accomplished by providing a leader detector 140 (note FIG. 10*a*) which optically reads the density difference between films and the leader. When a leader is detected, a diverter 142, after the knife 120 and prior to the track 125–126, pivots or opens to send the leader to waste. When the film is again detected, the knife 120 trims the leader off the end of the film, and the diverter 142 returns again to its initial position shown in FIG. 10*a* allowing film pieces 124 to move through to the track 125–126.

As noted earlier, the batch management computer 34 (FIG. 1*a*) maintains files relating batch numbers to bag numbers and splice numbers. It receives inputs particularly from the splicer 12, printer 18 and packaging machine 20, but can receive inputs from other sources in the system (such as the paper wallet collator 36). Its tasks include the following. The computer 34 maintains files on each batch which relate the order bag identification number, which is the combination of its (1) bag number, (2) dealer number, and (3) position and the sequence of the batch, to the bar coded splice number that is applied to the film roll. This information regarding bag numbers and film numbers can be communicated to the packaging machine 20 thereby making it possible to check if the correct films are going into the correct order bags.

The batch management computer 34 also communicates to the printer the number of prints to be made from each negative frame on a given roll of film (note FIG. 3). This eliminates the requirement of prior art systems for sorting the "one each" and "two each" orders prior to film splicing and eliminates the requirement of grouping together only "one eachs" into one roll of like films or "two eachs" into one roll of like films. This can be accomplished by having the operator of the splicer 12 look at each order bag 11 to see if it has been marked "one each" or "two each". If the quantity is not what is being spliced in majority into the film batch, the operator can depress a key indicating to the splicer 12 that that film will be, for example, "two each". The splicer 12 provides an indication of this "two each" requirement to the computer 34 along with the other information about the film for the computer to keep track of. Later in the processing, when the developed films are sent to the printer 18, the splice bar code can be read and correlated with the print encoding discussed earlier to determine how many prints per frame are to be made. This information can be fed to the printer to cause it to make the corresponding number of prints.

In addition to the foregoing functions, the computer 34 can provide the paper wallet collator 36 with information needed to produce a stack 35 of various paper wallets that match the various dealers' bags in a given batch. In addition, the computer can inform the collator which bags will need two paper wallets (to accommodate larger print orders) or which will need one wallet. The computer also can be used to generate reports or respond to inquiries regarding the log-in, log-out or work-in-process status of any batch or individual order based on inputs from the splicer 12, printer 18, packaging machine 20 and other stations in the photo finishing lab where data can be collected.

Figure 12:
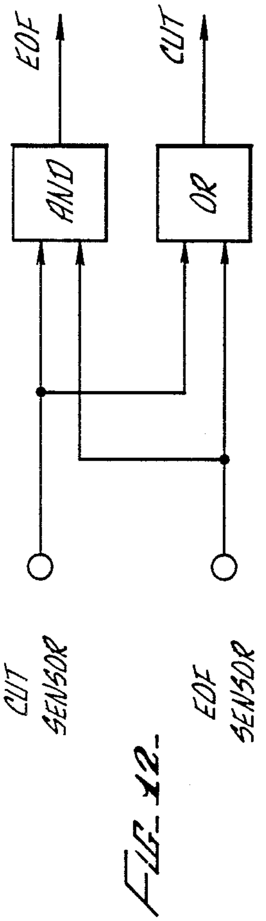
FIG. 12 is an alternative print punch sensor system.

FIG. 12 shows a block diagram of a logic circuit for use with existing print cutters having the usual dedicated cut punch sensor and end of order punch sensor for each edge of the paper. This adapter makes it possible to run print paper that has been punch encoded according to the present invention on such existing print cutters. Such prior type of cutters have two separate inputs, one that indicates cut each and every time it sees a hole (to cut apart prints) and the other that indicates end of order each and every time it sees a hole. The sensors of such prior machines would be confused by the apparent random locations of the punch holes in the paper that have been encoded according to the present invention. The logic circuit of FIG. 12 can be connected between the print paper punch hole sensors of existing cutters and their cut punch and end of order punch hole sensor inputs. The logic circuit simply comprises an AND gate and an OR gate, with both cut sensor inputs which sense the cut punch holes from the print paper and the end of order sensor being connected to both the AND gate and the OR gate. The output of the AND gate provides an end of order signal to the end of order punch hole sensor input of the existing prior art cutter, and the output of the OR gate provides a cut signal to the cut punch hole sensor input thereof. This circuit provides an output to the prior cutter's cut punch input any time one hole is seen on either side of the paper, and provides an output to the prior cutter's end of order input any time a hole is seen on both sides of the paper simultaneously, thereby making the presently encoded print paper appear the same as the print paper previously used in such prior systems.

It will be apparent to those skilled in the art that various improvements in photo processing techniques and labs have been shown and described. Modifications and variations can be made without departing from the spirit of the concepts of the present invention, and such variations, modifications and equivalents are intended to be encompassed within the scope of the appended claims.

What is claimed is:

1. A print encoding system for photofinishing apparatus comprising a printer for printing prints from developed film onto a roll of photographic print paper, the improvement comprising means for applying identification indicia to each film in a roll of films, reader means for reading the identification indicia from a film of a roll of films, punch means comprising first and second punches for punching holes in the roll of print paper for identifying (i) the end of a film order and (ii) a cut location between prints where the prints from the print roll are to be cut apart, the printer including means for supplying signals to the first and second punches to normally make punch marks in print paper representing the end of a film order and to provide print cut indicia between prints, the second punch normally providing the print cut indicia, and control means for controlling signals to said first and second punches to cause selective signals that normally would be applied to the second punch to be applied to the first punch to encode punch marks on the print paper specifically related to the identification indicia read by the reader means for the respective film.

2. A system as in claim 1 wherein punch marks are made on one edge of the print paper to represent zeros and punch marks are made on the opposite edge of the print paper to represent ones, and wherein said first punch applies ones punch marks and said second punch applies zeros punch marks.

3. A system as in claim 2 wherein said control means inhibits selective signals to the second punch and applies them to the first punch.

4. An encoding system as in claim 1 wherein said encode punch marks form a binary code.

5. An encoding system as in claim 1 wherein said encode punch mark form a binary coded decimal code.

6. A system as in claim 1 including film advance means for advancing the film of the roll of films for printing frames of a film onto the print paper, said film advance means including controlled roller means for periodically stopping advancement of the film to allow said reader to read said identification indicia while said film is stopped.

7. A system as in claim 1 including continuously running print cutting knife means and means for periodically advancing print paper into the knife means for causing prints to be cut apart by the knife means.

8. A method of encoding prints from developed film in a photo finishing apparatus comprising a printer for printing prints from developed film onto a roll or photographic print paper, comprising the steps of applying identification indicia to each film in a roll of films, reading the identification indicia from a film of a roll of films, punching holes in the roll of print paper for identifying the end of a film order and cut locations between prints where the prints from the print roll are to be cut apart, and varying the placement of the punch holes from side to side of the print paper to apply punch marks to the print paper specifically related to the identification indicia.

9. A print encoding system for photofinishing apparatus comprising a printer for printing prints from developed film onto a roll of photographic print paper, the improvement comprising means for applying identification indicia to each film in a roll of films, reader means for reading the identification indicia from a film of a roll of films, punch means comprising first and second punches for punching holes in the roll of print paper for identifying (i) the end of a film order and (ii) a cut location between prints where the prints from the print roll are to be cut apart, the printer including means for supplying signals to the first and second punches to normally make punch marks in print paper representing the end of a film order and to provide print cut indicia between prints, the second punch normally providing the print cut indicia, control means for controlling signals to said first and second punches to cause selected signals that normally would be applied to the second punch to be applied to the first punch to include punch marks on the print paper specifically related to the identification indicia read by the reader means for the respective film, and film accumulator means for receiving developed and printed film and for cutting apart sections of the film, the film accumulator means including film edge guides for receiving each such section of film and including tamping means for pushing each section from the edge guides to a catch bin.

10. A system as in claim 9 wherein said film edge guides are pivoted to separate and facilitate tamping of the film sections to the catch bin.

* * * * *